US011865593B2

(12) United States Patent
Ding

(10) Patent No.: US 11,865,593 B2
(45) Date of Patent: Jan. 9, 2024

(54) MECHANICAL BOOST TYPE CUP SPRAY-WASHING UNIT INTEGRATED WITH TEMPERATURE-ADJUSTMENT AND PRESS-CONTROL

(71) Applicant: Boyuan Ding, Jiangxi (CN)

(72) Inventor: Boyuan Ding, Jiangxi (CN)

( * ) Notice: Subject to any disclaimer, the term of this patent is extended or adjusted under 35 U.S.C. 154(b) by 183 days.

(21) Appl. No.: 17/533,123

(22) Filed: Nov. 23, 2021

(65) Prior Publication Data

US 2022/0339678 A1 Oct. 27, 2022

(30) Foreign Application Priority Data

Apr. 24, 2021 (CN) ........................ 202110444674.0

(51) Int. Cl.

*B05B 13/02* (2006.01)
*B08B 9/093* (2006.01)
*B08B 13/00* (2006.01)

(52) U.S. Cl.

CPC .......... *B08B 9/093* (2013.01); *B05B 13/0285* (2013.01); *B08B 13/00* (2013.01); *B08B 2209/08* (2013.01)

(58) Field of Classification Search

None

See application file for complete search history.

(56) References Cited

FOREIGN PATENT DOCUMENTS

CN 109985852 A * 7/2019

* cited by examiner

*Primary Examiner* — Levon J Shahinian

(57) ABSTRACT

This invention discloses a mechanical boost type cup spray-washing unit integrated with temperature-adjustment and press-control. This unit may regulate the mixing proportion of the cold water and hot water. It in combination with the boosting spray-wash effectively dissolves and washes the residues and juice on the inner wall of cup. This unit is clever in structure, integrates the temperature-adjustment and flush-washing, is directly hidden in the intermediate of the desk installation holes, never occupies surplus space of the kitchen desk, and may be installed in the standard small-hole of the kitchen water-trough desk without extra-opening, or may be directly fixed above the bottom of the water-trough after removal of the drain-panel.

15 Claims, 7 Drawing Sheets

MECHANICAL BOOST TYPE CUP SPRAY-WASHING UNIT INTEGRATED WITH TEMPERATURE-ADJUSTMENT AND PRESS-CONTROL

BACKGROUND OF THE INVENTION

This invention belongs to the field of technology of cup washing, and especially involves with a mechanical boost type cup spray-washing unit integrated with temperature-adjustment and press-control.

In daily life, after use the inner wall of the cup will be adhered with residues and juice. Generally, the washing process is divided 2 steps. The one is washing of its surface, and the other is primary washing of its inner wall. During the actual washing of cup's inner wall, the washing is incomplete and encounters some difficulties. People will spend much time in washing cup's inner wall, which is not advantageous to effectively finishing the washing work.

Hence, it is urgent to develop a novel cup washing unit to solve the problems.

BRIEF SUMMARY OF THE INVENTION

This invention aims at providing a mechanical boost type cup spray-washing unit integrated with temperature-adjustment and press-control to solve the prior problem of uneasy washing of the inner wall of cup and washing without spray of hot water.

In order to realize the objective, this invention provides the following technical scheme: It includes the temperature-adjustment mechanism and the press mechanism. The said temperature-adjustment mechanism includes the valve case, the temperature-adjustment valve rod, the bottom base, the upper porcelain sheet and the lower porcelain sheet. The rotation device of the said upper porcelain sheet is set inside the said valve case. The said lower porcelain sheet is fixed in the said bottom base. The said lower end-face of the upper porcelain sheet and the upper end-face of the lower porcelain sheet tightly close.

The said press mechanism includes both the water-outlet component set inside the temperature-adjustment valve rod and the elastic component for resetting of the said water-outlet component.

The said temperature-adjustment valve rod is in the upper-lower penetrating structure and is jointed with the outer wall of the said upper porcelain sheet.

The lower part of the said temperature-adjustment valve rod, the upper porcelain sheet, the lower porcelain sheet, and the bottom base are substantially set inside the valve case.

The said lower porcelain sheet is penetratingly set with the first water-passing hole.

The said upper porcelain sheet is penetratingly set with the second water-passing hole.

In the design scheme of this invention, two first water-passing holes are axis-symmetrically arranged and they are towards to a same side.

In the design scheme of this invention, the said water-outlet component is composed of the first water-outlet rod and the water cock core. The said water cock core is screwed with the lower-end of the said first water-outlet rod. The inner wall of the said temperature-adjustment valve rod is set with a boss. The said first water-outlet rod is located above the said boss, and the said water cock core downwards passes the said boss and connects with the first water-outlet rod. There is gap between the said water cock core and the said boss, and the bottom of the said water cock core is set in such a way to cover the entire boss-formed space.

The said first water-outlet rod is in an upper-lower penetrating structure.

The said water cock core is inside hollow, the upper end is set with an opening and the outer wall is set with several first water-inlet ports connecting with the inside of the said water cock core.

The said elastic component is the spring and the said spring is set on the outer side of the said water cock core and tightly closed with the bottom end of the said the first water-outlet rod.

In design scheme of this invention, under the pushing of the said the spring, the upper end face of the said the first water-outlet rod is higher than the upper end face of the said temperature-adjustment valve rod.

In design scheme of this invention, the water is sealed with sealing rings between the said the first water-outlet rod, the water cock core, the upper porcelain sheet and the said temperature-adjustment valve rod.

In design scheme of this invention, the said second water-outlet rod and the inner wall of the said temperature-adjustment rod are provided with the staircase-like steps.

The said water-outlet component is composed of the second water-outlet rod, the inner middle hole and the upper end are opened, the outer wall is provided with several second water-inlet ports, area of the bottom end of the said second water-outlet rod completely covers the gaps between the said steps, and gaps exist between the outer wall of the said second water-outlet rod and the said temperature-adjustment valve rod.

The said elastic component is the conic spring, and the said conic spring is fixed at the bottom end of the said second water-outlet rod, and is butted on the upper end face of the said upper porcelain sheet.

In the design scheme of this invention, under the pushing of conic spring, the upper end face of the said second water-outlet rod is higher than the one of the said temperature-adjustment valve rod.

In the design scheme of this invention, the middle and the bottom end of the said second water-outlet rod, and the inner wall of the said temperature-adjustment valve rod are set with sealing rings and sealing rings are also provided between the upper porcelain sheet and the said temperature-adjustment valve rod.

In the design scheme of this invention, the said temperature-adjustment mechanism and the press mechanism are fixed in the main body.

In the design scheme of this invention, the top of the said main body is provided with the drain pan, and the said drain pan is set with an opening for outwards drain and the said opening is downwards inclined for easy water flow.

In the design scheme of this invention, the upper outside circle of the said temperature-adjustment valve rod is inserted with the temperature-adjustment handle.

In the design scheme of this invention, the inside of the said main body is set with external water tube connected with the said first water-passing hole, and the said external water tube includes a hot water tube and a cold water tube.

In the design scheme of this invention, the top of the said water-outlet component is provided with water-outlet nozzle and outside of the said water-outlet nozzle is provided with support pad.

In the design scheme of this invention, the outer wall of the said main body is set with the locking part to fix the said a mechanical boost type cup spray-washing unit integrated with temperature-adjustment and press-control.

In the design scheme of this invention, the said locking part includes the rubber gasket, stainless steel gasket, hex nut and jacking screw.

Compared with the prior art, this invention has the following benefiting effects:

(1) This unit may freely regulate the mixing proportion of the cold water and the hot water. It in combination with the boosting spray-wash effectively dissolves and washes the residues and juice on the inner wall of cup. It has a short washing time and high efficiency and hot water also plays a role of sterilization, which is suitable for popularization and application.

(2) This unit is clever in structure, integrates the temperature-adjustment and flush-washing, is directly hidden in desk installation hole, never occupies surplus space of the kitchen desk, and may be installed in the kitchen water-trough desk or directly fixed above the water-trough after removal of the drain-panel.

1—temperature-adjustment valve rod
2—upper porcelain sheet
3—lower porcelain sheet
4—bottom base
5—valve case
6—the first water-passing hole
7—the second water-passing hole
8—water-outlet component
9—boss
10—elastic component
11—water cock core
12—first water-inlet port
13—second water-inlet port
14—steps
15—temperature-adjustment handle
16—water-outlet nozzle
17—support pad
18—main body
19—drain pan
20—external water tube
21—locking part
81—the first water-outlet rod
82—the second water-outlet rod
101—spring
102—conic spring
210—rubber gasket
211—stainless steel gasket
212—hex nut
213—jacking screw

DETAILED DESCRIPTION OF THE INVENTION

In the following pages, in combination with the attached drawings of the implementation examples of this invention, the technical schemes hereof are clearly and completely described. Obviously, the described implementation examples are merely part of this invention, instead of the entire implementation examples. All other implementation examples which are obtained by common technicians in this field on basis of this invention without offering any creative labors belong to the protection scope of this invention.

Implementation Example 1

Figure 2:
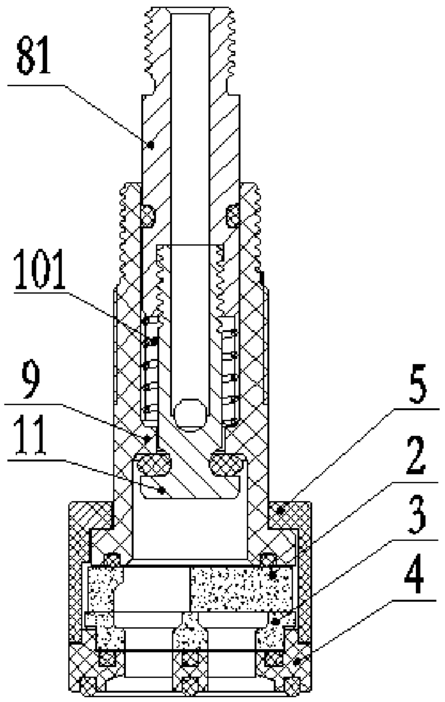
FIG. 2 is the schematic diagram of the structure of temperature-adjustment mechanism and press mechanism of the first implementation example of this invention.
Figure 3:
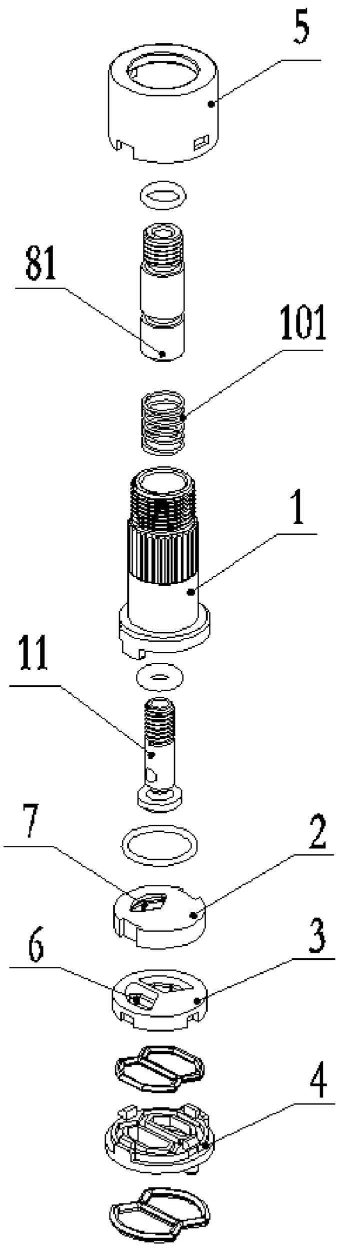
FIG. 3 is the explosion view of FIG. 2.
Figure 4:
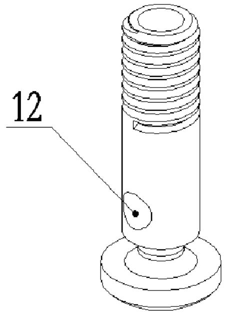
FIG. 4 is the schematic diagram of the structure of water cock core of this invention.

FIG. 2 and FIG. 3 are schematic diagrams of the structure of temperature-adjustment mechanism and press mechanism in the first implementation example of this invention, where, valve case 5 and bottom base 4 are for installation of the upper and the lower position to form the basic structure, they are inside hollow and are fixed with temperature-adjustment valve rod 1, the lower end of temperature-adjustment valve rod 1 is inserted inside the hollow cavity of valve case 5, the lower side of inside of valve case 5 is provided with lower porcelain sheet 3, the top of lower porcelain sheet 3 is laid with upper porcelain sheet 2, upper porcelain sheet 2 is the non-fixed setting, the bottom end of temperature-adjustment valve rod 1 is provided with the fixture block, meanwhile, the outer wall of upper porcelain sheet 2 is provided with the groove that is jointed with the above-mentioned fixture block to make upper porcelain sheet 2 rotate under the drive of temperature-adjustment valve rod 1, a ring-shaped anti-water sealing upper porcelain sheet washer is set between upper porcelain sheet 2 and the bottom face of temperature-adjustment valve rod 1, the lower porcelain sheet washer is also provided between lower porcelain sheet 3 and bottom base 4, and the lower end of bottom base 4 is also provided with the anti-water sealing bottom base washer. The above-mentioned lower porcelain sheet washer, bottom base washer and the middle of bottom base 4 are provided with the penetrating hole which is adaptive with the first water-passing hole 6 on lower porcelain sheet 3. Lower porcelain sheet 3 is provided with two first water-passing holes 6, i.e., 1 hot water hole and 1 cold water hole. The said hot water hole and cold water hole are respectively connected with external water tube 20, i.e. the hot water inlet tube and cold water inlet tube. The hot water and cold water separately through the hot water hole and the cold water hole flow upwards. Upper porcelain sheet 2 is provided with the second water-passing hole 7, called as mixed water hole, that means that regulating the rotation direction of temperature-adjustment valve rod 1 to make the cold/hot water at different proportions pass the mixed water hole and enter the inside temperature-adjustment valve rod 1 above upper porcelain sheet 2. Upper porcelain sheet 2 may be rotated to the angle within the pre-set range, the pre-set angle is determined as per the size and position of first water-passing hole 6 to enable second water-passing hole 7 to be independently right above first water-passing hole 6 and enable second water-passing hole 7 to rotate to the median position of two first water-passing holes 6 to keep the hot water and the cold water at the same inlet proportion. It also can rotate to any position of two first water-passing holes 6 to set the hot water and the cold water at any proportion, i.e. it can form full-cold water, full-hot water and mixed water.

Temperature-adjustment valve rod 1 penetrates upwards and downwards. The inside median position is provided with boss 9, boss 9 may be in ring-shape or other regular polygons and in this invention the ring-shape is preferential. There is a passageway between boss 9 and water cock core 11 is provided inside the said passageway, the upper part of water cock core 11 is the a column, the lower part is a pan and the two parts are integrally connected. The upper portion of the column is provided with the screw, and the diameter of the lower end is less that the one of the upper end in an effect that when water cock core 11 is placed to the inside of temperature-adjustment valve rod 11, the water-sealing washer is provided between the pan at bottom and the bottom of boss 9. Water cock core 11 at upper side of boss 9 is in ring-form provided with spring 101.

The upper thread of water cock core 11 is connected with the inner side of the first water-outlet rod 81, and the inside of first water-outlet rod 81 is upwards-downwards penetrating. It is slide-connected at the through hole inside temperature-adjustment valve rod 1 and anti-water sealing rings are provided between inner walls of temperature-adjustment valve rod 1.

One or several first water-inlet ports 12 at the outer wall of water cock core 11 may be set, which is determined as per the actual conditions.

The external hot water source and cold water source are fed through external water tube 20 to two first water-passing holes 6 and then through second water-passing hole 7 to the inner cavity at lower part of temperature-adjustment valve rod 1 and they are kept at a given water pressure. When at the action of external force the first water-outlet rod 81 is downwards moved and meanwhile drive water cock core 11 to move downwards. At that time, spring 101 is compressed and the gap of corresponding height is expanded between the pan at bottom of water cock core 11 and boss 9, the water through this gap enters first water-inlet port 12 on the surface of water cock core 11 and finally sprays out through first water-outlet rod 81.

Implementation Example 2

Figure 5:
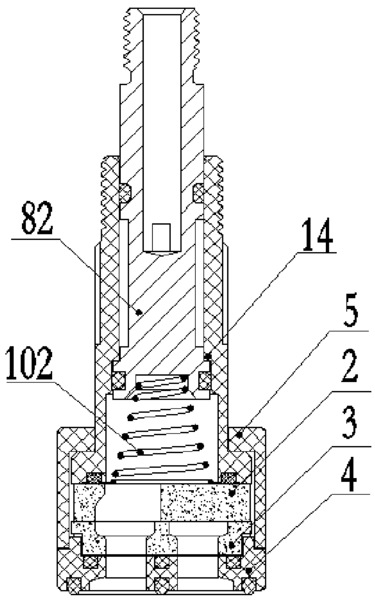
FIG. 5 is the schematic diagram of the structure of temperature-adjustment mechanism and press mechanism of the second implementation example of this invention.
Figure 6:
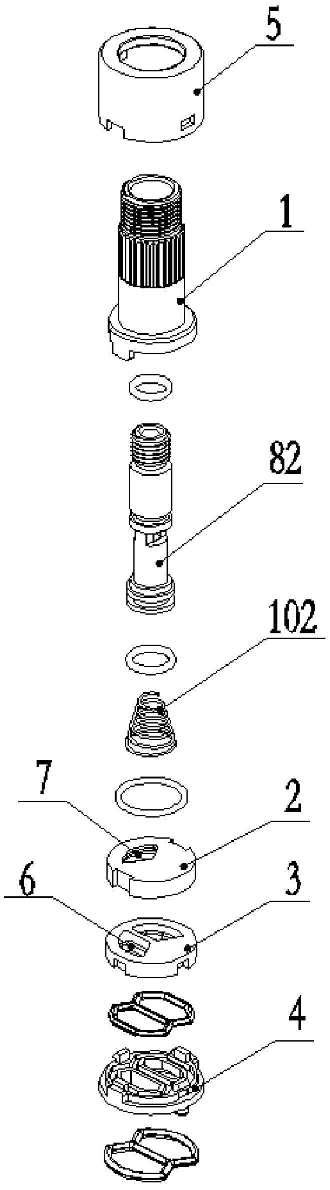
FIG. 6 is the explosion view of FIG. 5.
Figure 7:
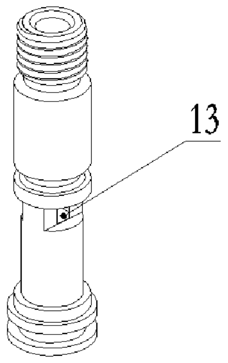
FIG. 7 is the schematic diagram of the structure of the second water-outlet rod of this invention.
Figure 8:
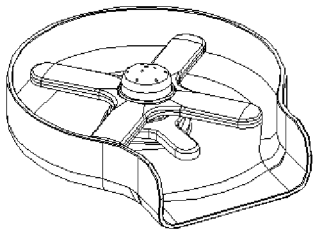
FIG. 8 is the schematic diagram of the structure of this invention.

FIG. 5 and FIG. 6 are the schematic diagram of the structure of the second implementation example of the temperature-adjustment mechanism and press mechanism of this invention, where valve case 5 and bottom base 4 are for installation of the upper and the lower position to form the basic structure. They are inside hollow and are fixed with temperature-adjustment valve rod 1, the lower end of temperature-adjustment valve rod 1 is inserted inside the hollow cavity of valve case 5, the lower side of inside of valve case 5 is provided with lower porcelain sheet 3, and the top of lower porcelain sheet 3 is laid with upper porcelain sheet 2. Upper porcelain sheet 2 is the non-fixed setting and the bottom end of temperature-adjustment rod is provided with the fixture block. The outer wall of upper porcelain sheet 2 is set with groove for inserting the said fixture block to make upper porcelain sheet 2 rotate under the drive of temperature-adjustment rod 1. A ring-shaped anti-water sealing upper porcelain sheet washer is fixed between upper porcelain sheet 2 and bottom of temperature-adjustment rod 1 and the lower porcelain sheet washer is fixed between lower porcelain sheet 3 and bottom base 4. The lower end of bottom base 4 is also provided with anti-water sealing lower porcelain sheet washer. The lower porcelain sheet washer, bottom base washer and middle of bottom base 4 are provided with penetrating hole adapting with first water-pass hole 6 of the lower porcelain sheet 3. Lower porcelain sheet 3 is fixed with two first water-pass holes 6 (1 hot water hole and 1 cold water hole). The said hot water hole and the cold water hole is respectively connected with external water tube 20 (i.e. connected with the hot water inlet tube and the cold water inlet tube). The hot water and the cold water respectively upwards flow through the hot water hole and the cold water hole. Upper porcelain sheet 2 is provided with second water-pass hole 7, called as mixed water hole. Regulating the rotation direction of temperature-adjustment rod 1 enables cold/hot water at different proportion to pass the mixed water hole, and in turn enter the inside of temperature-adjustment rod 1 above upper porcelain sheet 2. Upper porcelain sheet 2 may be rotated to any angle within the pre-set range and the pre-set angle is dependent on the size and position of first water-pass hole 6. On one hand, it makes the second water-pass hole 7 be able independently right above the first water-pass hole 6, and on the other hand it is able to make the second water-pass hole 7 rotate to the median position of two first water-pass holes 6 so as to keep the hot water and the cold water at the same proportion, and it also rotates to any position of two first water-pass holes 6 and makes the hot water and the cold water freely conduct any mixing, i.e. forms the full-cold water, the full-hot water and the mixed water.

In this implementation example, water-outlet component 8 consists of second water-outlet rod 82. The structure of upper half of the second water-outlet rod 82 is identical to the water cock core in the first implementation example. The bottom end is connected with a column. The surface of the said column is set with second water-inlet port 13, and the quantity of second water-inlet port 13 is determined as per the actual conditions. The lower end portion of column is provided with the bottom plate and the median part of the bottom plate is provided with ring-shaped groove for placement of the water-sealing washer.

The valve rod sealing ring is fixed between second water-outlet rod 82 and temperature-adjustment rod 1 to avoid water leakage.

The center of the inner wall of temperature-adjustment rod 1 is provided with staircase steps 14 which are used to limit upwards movement of second water-outlet rod 82 and control its movement travel.

Conic spring 102 is inserted at lower portion of second water-outlet rod 82. Conic spring 102 is upper-narrow and lower-wide, and its lower end is set above upper porcelain sheet 2.

The external hot water source and the cold water source respectively through external water tube 20 flow to two first water-pass ports 6, in turn through second water-pass port 7 enter the inside cavity chamber of lower portion of temperature-adjustment rod 1, thereby, which keep a given water pressure. When under the action of external force second water-outlet rod 82 downwards moves, conic spring 102 is compressed and water enters through the gap between second water-outlet rod 82 and temperature-adjustment rod 1, passes second water-inlet 13 of second water-outlet rod 82 and finally outwards sprays from the port of the upper end of second water-outlet rod 82.

Implementation Example 3

Figure 9:
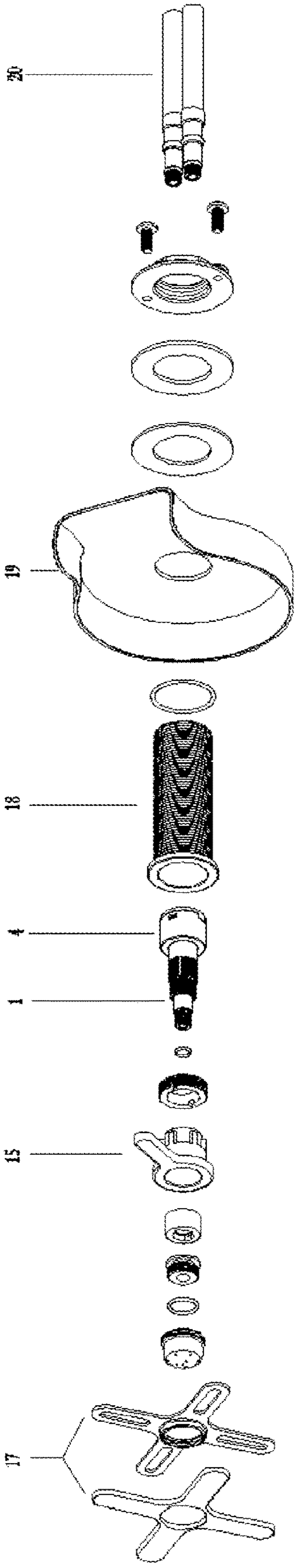
FIG. 9 is the schematic diagram of the structure of the drain pan and its inside temperature-adjustment handle and support pad of this invention.

In the above-mentioned two implementation examples, the upper outer margin of both first water-outlet rod 81 and second water-outlet rod 82 are set with threads to connect water-outlet nozzle 16, and the peripheral side of water-outlet nozzle 16 is provided with support pad 17. Water-outlet nozzle 16 encloses the upper portion of entire first water-outlet rod 81 and second water-outlet rod 82 and it is provided with several spray ports so as to spray-wash the cup from several angles. Support pad 17 is used for supporting when the cup is placed upside-down. It may be designed as petal shape shown in FIG. 9 and also designed as ring-shaped plate to support the cup which is placed upside-down.

The upper outer margin of said temperature-adjustment valve rod 1 is belled with temperature-adjustment handle 15. The rotation of temperature-adjustment handle 15 drives temperature-adjustment valve rod 1 and upper porcelain sheet 2 to rotate so as to change the upper-lower corresponding relationship between the second water-passing hole on upper porcelain sheet 2 and the first water-passing hole 6 on lower porcelain sheet 3, regulate the inlet proportion of the hot water and the cold water and finally make the water temperature for washing the cup meet the user's demanded.

The outer part of temperature-adjustment valve rod 1 is fixed with main body 18. The main body 18 protects and isolates the inside members, the outer surface of main body 18 is provided with a locking part which can integrally fix this unit and through this locking part this unit may be installed on the desk of kitchen water trough and at the bottom of water trough.

The top of main body 18 is set with drain pan 19. The pan is set with openings for outwards drain and the openings are inclined downwards for flow-out of the waste-water after washing.

Figure 1:
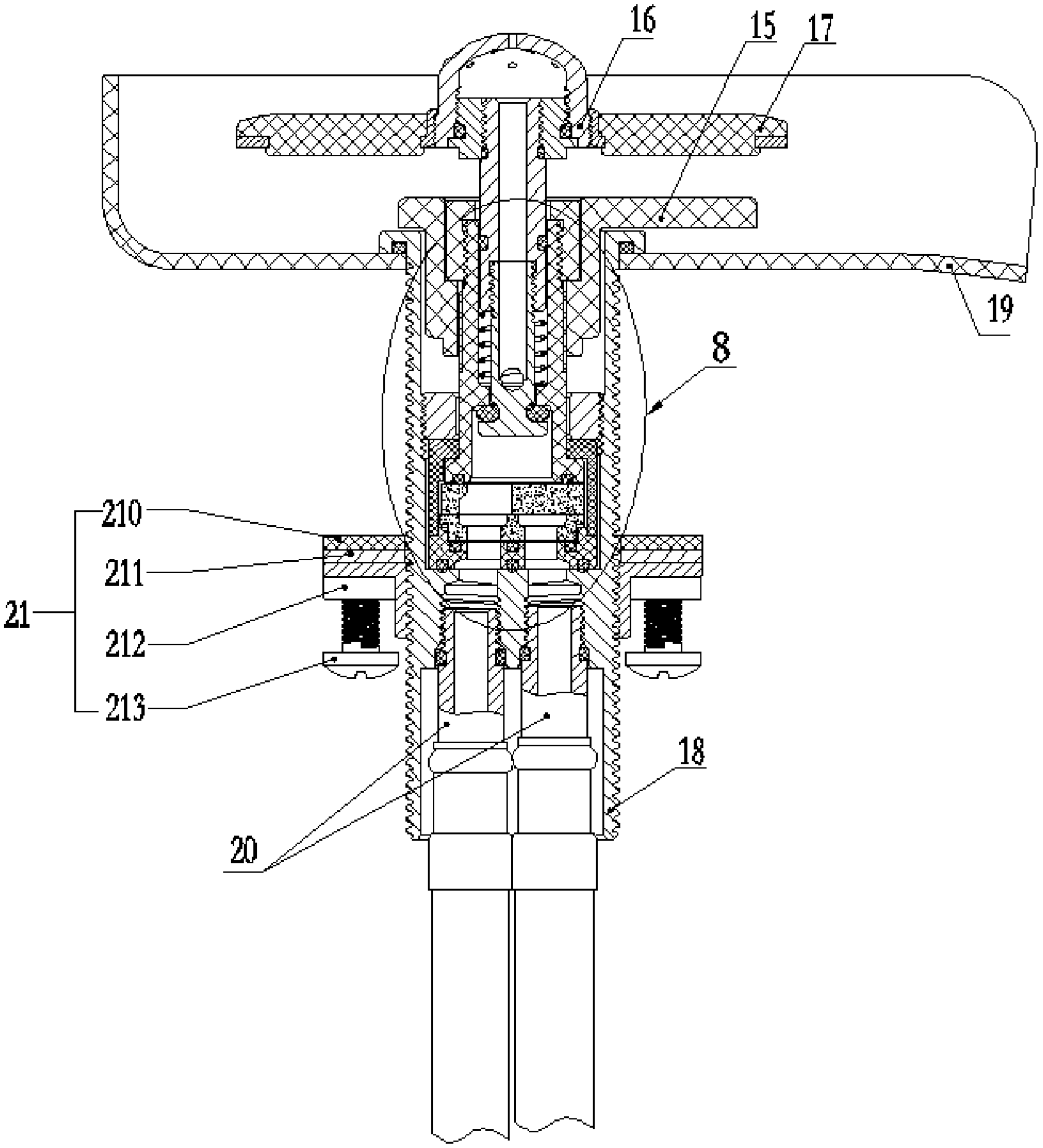
FIG. 1 is the schematic diagram of the integral structure of the first implementation example of this invention.

In order to well describe the implementation examples, the parts of this implementation example and the units in implementation example 1 are assembled and FIG. 1 is the schematic diagram of the assembled unit.

Though implementation examples in this invention are disclosed and described, common technicians may under the condition of not deviating the principle and spirit of this invention make several changes, modifications, substitutions and derivations to these implementation examples and the scope of this invention is limited by the attached claims and their equivalents.

What is claimed is:

1. A mechanical boost type cup spray-washing unit integrated with temperature-adjustment and press-control, comprising a temperature-adjustment mechanism and a press mechanism;

said temperature-adjustment mechanism comprises a valve case, a temperature-adjustment valve rod, a bottom base, an upper porcelain sheet and a lower porcelain sheet;

a rotation device of said upper porcelain sheet is set inside said valve case, said lower porcelain sheet is fixed in said bottom base, and a lower end-face of the upper porcelain sheet and an upper end-face of the lower porcelain sheet are in contact with each other;

said press mechanism comprises a water-outlet component set inside said temperature-adjustment valve rod, and elastic components for resetting of said water-outlet component;

said temperature-adjustment valve rod is in an upper-lower penetrating structure and is jointed with an outer wall of said upper porcelain sheet;

a lower part of said temperature-adjustment valve rod, the upper porcelain sheet, the lower porcelain sheet, and the bottom base are substantially set inside the valve case;

said lower porcelain sheet is penetratingly set with at least one first water-passing hole;

said upper porcelain sheet is penetratingly set with a second water-passing hole.

2. The mechanical boost type cup spray-washing unit integrated with temperature-adjustment and press-control of claim 1, wherein two first water-passing holes are axis-symmetrically arranged.

3. The mechanical boost type cup spray-washing unit integrated with temperature-adjustment and press-control of claim 2, wherein said water-outlet component is composed of a first water-outlet rod and a water cock core; said water cock core is screwed with a lower-end of said first water-outlet rod; an inner wall of said temperature-adjustment valve rod is set with a boss; said first water-outlet rod is located above said boss, and said water cock core downwards passes said boss and connects with the first water-outlet rod; there is a gap between said water cock core and said boss; and a bottom of said water cock core is set in such a way to cover a boss-formed space said first water-outlet rod is in an upper-lower penetrating structure;

said water cock core is hollow inside, an upper end of said water cock core is set with an opening and an outer wall of said water cock core is set with a plurality of first water-inlet ports connecting with an interior of said water cock core;

said elastic component is a spring; and said spring is set on an outer side of said water cock core and abuts against a bottom end of said first water-outlet rod.

4. The mechanical boost type cup spray-washing unit integrated with temperature-adjustment and press-control of claim 3, wherein under compression of said spring; an upper end face of said first water-outlet rod is higher than an upper end face of said temperature-adjustment valve rod.

5. The mechanical boost type cup spray-washing unit integrated with temperature-adjustment and press-control of claim 4, wherein water is sealed with sealing rings between said first water-outlet rod, said water cock core, said upper porcelain sheet and said temperature-adjustment valve rod.

6. The mechanical boost type cup spray-washing unit integrated with temperature-adjustment and press-control of claim 2, wherein an inner wall of said temperature-adjustment valve rod is set with a staircase-step;

said water-outlet component comprises a second water-outlet rod, an inner middle hole is opened in said second water-outlet rod, and an upper end of second water-outlet rod is opened; an outer wall of the second water-outlet rod is provided with a plurality of second water-inlet ports, a bottom end area of said second water-outlet rod completely covers gaps between said second water-outlet rod and said staircase-steps, and gaps exist between an outer wall of said second water-outlet rod and said temperature-adjustment valve rod; said elastic component is a conic spring, and said conic spring is fixed at a bottom end of said second water-outlet rod, and abuts against an upper end face of said upper porcelain sheet.

7. The mechanical boost type cup spray-washing unit integrated with temperature-adjustment and press-control of claim 6, wherein under compression of said conic spring, an upper end face of said second water-outlet rod is higher than an upper end face of temperature-adjustment valve rod.

8. The mechanical boost type cup spray-washing unit integrated with temperature-adjustment and press-control of claim 7, wherein a middle part and the bottom end of said second water-outlet rod, and the inner wall of said temperature-adjustment valve rod are set with sealing rings; and sealing rings are also provided between said upper porcelain sheet and said temperature-adjustment valve rod.

9. The mechanical boost type cup spray-washing unit integrated with temperature-adjustment and press-control of claim 1, wherein said temperature-adjustment mechanism and said press mechanism are fixed within a main body.

10. The mechanical boost type cup spray-washing unit integrated with temperature-adjustment and press-control of claim 9, wherein a top of said main body is provided with a drain pan, and said drain pan is set with an opening for outwards draining; and said opening is downwards inclined.

11. The mechanical boost type cup spray-washing unit integrated with temperature-adjustment and press-control of claim 9, wherein an outer wall of said main body is set with a locking part to fix said mechanical boost type cup spray-washing unit integrated with temperature-adjustment and press-control.

12. The mechanical boost type cup spray-washing unit integrated with temperature-adjustment and press-control of claim 11, wherein said locking part comprises a rubber gasket, a stainless steel gasket, a hex nut and jacking screws.

13. The mechanical boost type cup spray-washing unit integrated with temperature-adjustment and press-control of claim 1, wherein an upper outside circle of said temperature-adjustment valve rod is inserted with a temperature-adjustment handle.

14. The mechanical boost type cup spray-washing unit integrated with temperature-adjustment and press-control of claim 1, wherein an interior of said main body is set with at least one external water tube connected with said at least one first water-passing hole.

15. The mechanical boost type cup spray-washing unit integrated with temperature-adjustment and press-control of claim 1, wherein a top of said water-outlet component is provided with a water-outlet nozzle; and an outside of said water-outlet nozzle is provided with a support pad.

* * * * *